United States Patent
Ahn (10) Patent No.: US 6,954,936 B2
(45) Date of Patent: Oct. 11, 2005

(54) TRAY LOCKING APPARATUS OF OPTICAL DISK DRIVE AND OPTICAL DISK DRIVE ADOPTING THE SAME

(75) Inventor: Cheol-woong Ahn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 131 days.

(21) Appl. No.: 10/434,360

(22) Filed: May 9, 2003

(65) Prior Publication Data

US 2004/0004927 A1 Jan. 8, 2004

(30) Foreign Application Priority Data

Jul. 6, 2002 (KR) ........................................ 2002-39152

(51) Int. Cl.[7] .............................................. G11B 17/04
(52) U.S. Cl. ...................................... 720/610; 720/609
(58) Field of Search ................................ 720/601, 609, 720/610

(56) References Cited

U.S. PATENT DOCUMENTS

| | | | |
|---|---|---|---|
| 6,181,663 B1 * | 1/2001 | Kakuta et al. ............... | 720/610 |
| 2003/0072243 A1 * | 4/2003 | Yeh et al. ................... | 369/75.2 |
| 2003/0103433 A1 * | 6/2003 | Bae et al. ................... | 369/75.2 |
| 2003/0117929 A1 * | 6/2003 | Bae et al. ................... | 369/75.2 |
| 2003/0137917 A1 * | 7/2003 | Hekizono ................... | 369/75.2 |
| 2004/0140192 A1 * | 7/2004 | Sung et al. .................. | 200/400 |

FOREIGN PATENT DOCUMENTS

| | | | | |
|---|---|---|---|---|
| JP | 06068572 A | * | 3/1994 | ............ G11B/17/04 |
| JP | 09282764 A | * | 10/1997 | ............ G11B/17/04 |
| JP | 2000011513 A | * | 1/2000 | ............ G11B/17/04 |
| JP | 2001-344863 | | 12/2001 | |

OTHER PUBLICATIONS

Machine Translated Copy of JP 2001–344863 A, Published Dec. 14, 2001.*

* cited by examiner

*Primary Examiner*—William J Klimowicz
(74) *Attorney, Agent, or Firm*—Staas & Halsey LLP (57) ABSTRACT

A tray locking apparatus of an optical disk drive including a fixed frame and a tray that moves in and out of the fixed frame to load and unload a disk. The tray locking apparatus includes a first locking portion provided on the fixed frame, and a first lever, that has a second locking portion selectively coupled to the first locking portion, and moves between a coupling position and a releasing position. A first elastic member biases the first lever in a direction toward the coupling position. A switching unit installed at the tray locks the first lever at the coupling position by a magnetic force, and unlocks and moves the first lever to the releasing position by temporarily offsetting the magnetic force. A returning unit makes the first lever return to the coupling position from the releasing position when the tray moves out of the fixed frame.

40 Claims, 9 Drawing Sheets

TRAY LOCKING APPARATUS OF OPTICAL DISK DRIVE AND OPTICAL DISK DRIVE ADOPTING THE SAME

BACKGROUND OF THE INVENTION

This application claims the priority of Korean Patent Application No. 2002-39152 filed Jul. 6, 2002 in the Korean Intellectual Property Office, the disclosure of which is incorporated herein in its entirety by reference.

1. Field of the Invention

The present invention relates to an optical disk drive, and more particularly, to a tray locking apparatus which is made slim to be adopted in a slim optical disk drive.

2. Description of the Related Art

In general, optical disk drives record information on a disk medium, such as a compact disk (CD) or digital video disk (DVD), and reproduce information therefrom. A tray on which the disk is mounted is installed in the optical drive to slide in and out of a body. Typical optical disk drives are loaded and unloaded by a loading motor. A tray installed in a slim optical disk drive used for a notebook computer, however, manually slides in and out of the slim optical disk drive, and thus, a tray locking apparatus to lock or unlock the tray with respect to a body is needed.

Figure 1:
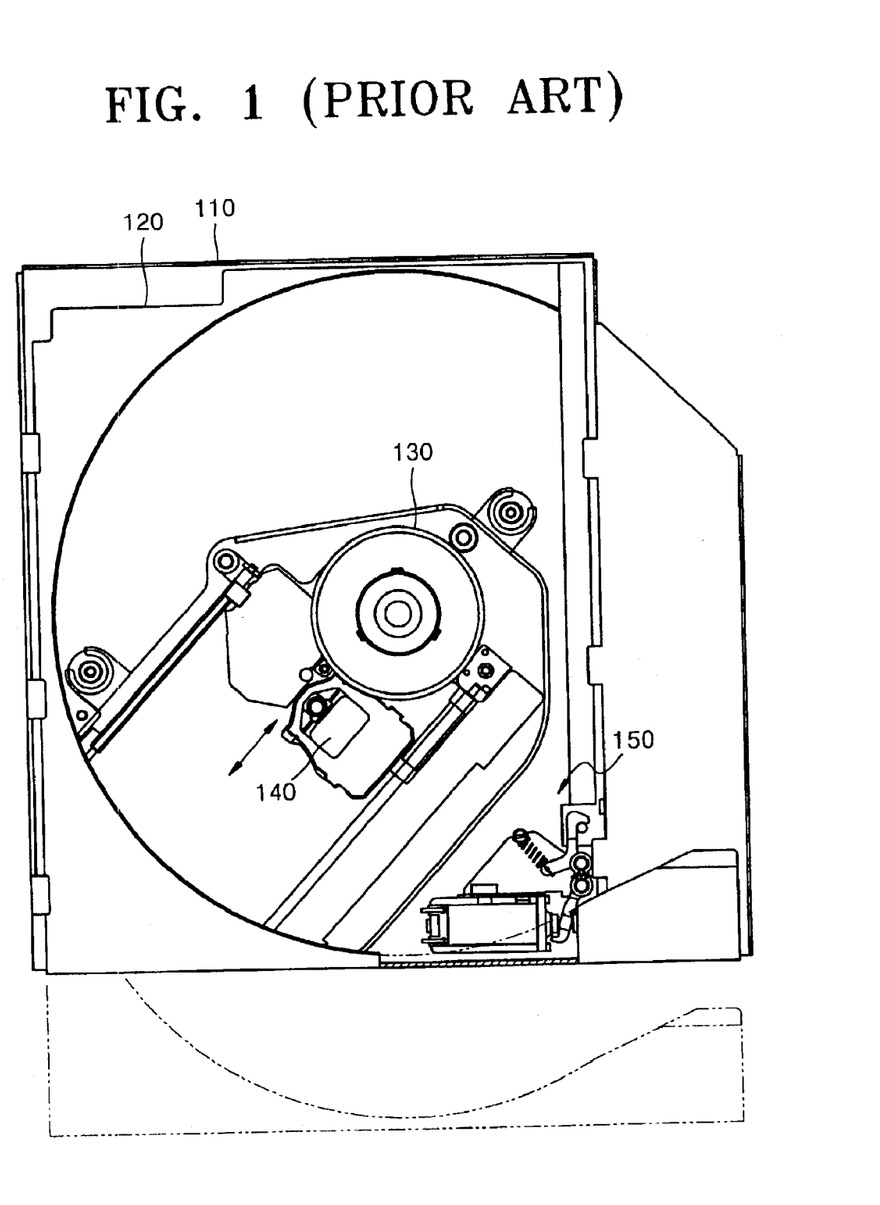
FIG. 1 is a plan view illustrating an optical disk drive adopting the conventional tray locking apparatus.

FIG. 1 shows an optical disk drive adopting a conventional tray locking apparatus. Referring to the drawing, the optical disk drive includes a fixed frame 110, a tray 120 sliding in and out with respect to the fixed frame 110, a spindle motor 130 rotating a disk, an optical pickup portion 140 to record or reproduce information on and from the disk, and a locking apparatus 150 locking and unlocking the tray 120.

Figure 2:
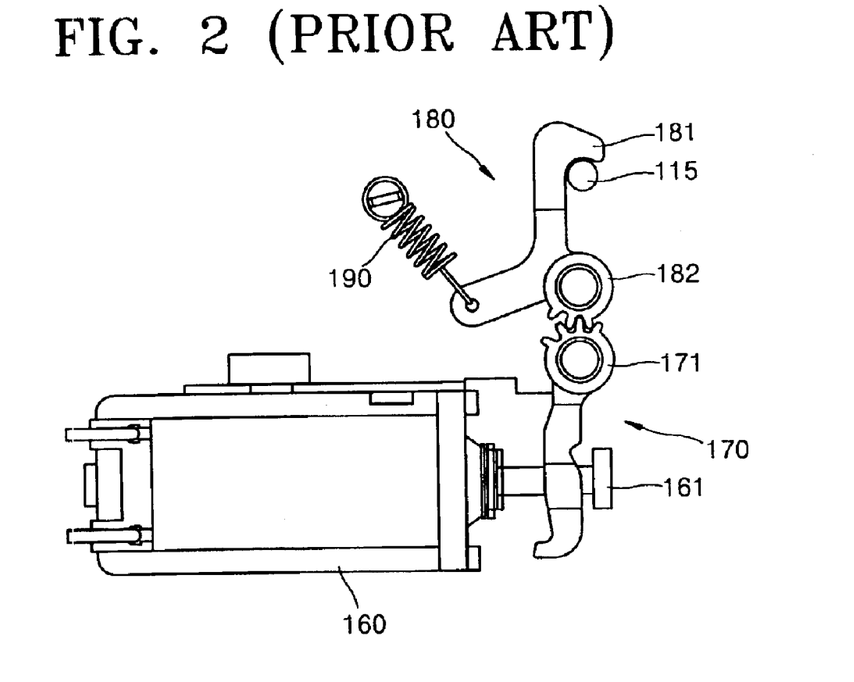
FIG. 2 is a plan view illustrating a state in which the tray is locked by the tray locking apparatus of FIG. 1.
Figure 3:
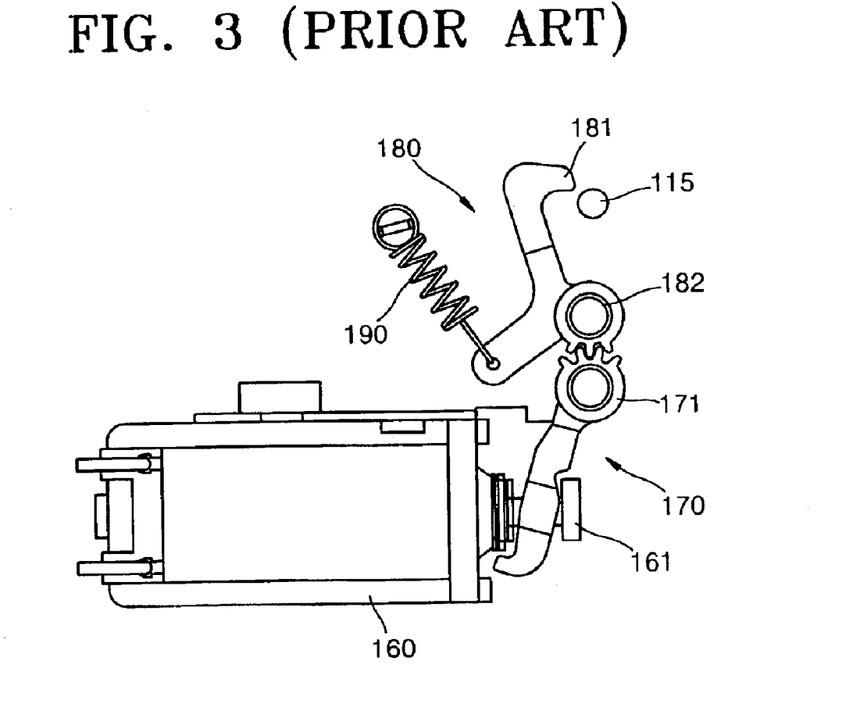
FIG. 3 is a plan view illustrating a state in which the tray is unlocked by the tray locking apparatus of FIG. 1.

FIGS. 2 and 3 show states in which the tray is locked and unlocked, respectively, by the tray locking apparatus shown in FIG. 1. Referring to FIG. 2, a solenoid 160 having a mobile piece 161, a first arm 170 connected to the mobile piece 161 and pivoting according to movement of the mobile piece 161, and a locking arm 180 connected to the first arm 170 are provided on the tray 130. A locking post 115 is installed on the fixed frame 110.

A first gear portion 171 is located on a pivot shaft of the first arm 170. A hook portion 181 that engages the locking post 115, and a second gear portion 182 engaged with the first gear portion 171 to pivot the locking arm 180, are provided on the locking arm 180. A spring 190, providing an elastic force to bias the locking arm 180 in a direction in which the locking post 115 and the hook portion 181 are coupled, is installed at one end of the locking arm 180.

FIG. 3 shows the operation of the conventional tray locking apparatus shown in FIG. 2. When current is applied to the solenoid 160, the mobile piece 161 is moved by a magnetic force of the solenoid 160 to the left on the drawing, so that the first arm 170 connected to the mobile piece 161 pivots clockwise on the drawing. Then the locking arm 180, having the second gear portion 182 engaged to the first gear portion 171, pivots counterclockwise so that the hook portion 181 is released from the locking post 115. In this state, the tray 120 is manually pulled to to unload the disk.

When the application of current to the solenoid 160 is stopped, the mobile piece 161 returns to the original position and the locking arm 180 is returned to the original position by the spring 190. In this state, when the tray 120 is manually pushed to load the disc, the hook portion 181 and the locking post 115 are engaged so that the tray 120 is locked.

To prevent unlocking of the tray 120 by an impact, the elastic force of the spring 190, by which the hook portion 181 and the locking post 115 are coupled, needs to be as great as possible. To unlock the tray 120, however, the operational force imparted to the mobile piece 161 by the solenoid 160 must be greater than the elastic force of the spring 190. Thus, to increase the elastic force of the spring 190, the operational force imparted to the mobile piece 161 needs to increase commensurately.

But to increase the operational force of the mobile piece 161, a large solenoid is used, or the amount of current applied to the solenoid needs to be increased. Since, in general, there is a limit to the amount of available current in a notebook computer, a large solenoid having a great capacity is used. But the use of a large solenoid hinders making a slim optical disk drive, and increases the cost.

SUMMARY OF THE INVENTION

To solve the above and/or other problems, the present invention provides a tray locking apparatus of an optical disk drive which enables making slim optical disk drives with reduced manufacturing costs by employing a magnetic body, a coil portion offsetting a magnetic force of the magnetic body, and an optical disk drive incorporating the tray locking apparatus.

According to an aspect of the present invention, a tray locking apparatus of an optical disk drive including a fixed frame and a tray that moves in and out of the fixed frame to load and unload a disk, the tray locking apparatus having a first locking portion provided on the fixed frame, a first lever having a second locking portion selectively coupled to the first locking portion and installed at the tray to move between a coupling position, where the first locking portion and the second locking portion are coupled, and a releasing position, where the first locking portion and the second locking portion are separated. A first elastic member applies an elastic force to the first lever in a direction toward the coupling position, and a switching unit installed at the tray, and locking the first lever at the coupling position by a magnetic force, and unlocks and moves the first lever to the releasing position by temporarily offsetting the magnetic force. Additionally, a returning unit makes the first lever return to the coupling position from the releasing position when the tray is unloaded.

According to anther aspect of the present invention, an optical disk drive has a fixed frame, a tray that moves in and out of the fixed frame to load and unload a disk, and a tray locking apparatus having a first locking portion provided on the fixed frame, a first lever having a second locking portion selectively coupled to the first locking portion and installed at the tray to move between a coupling position, where the first locking portion and the second locking portion are coupled, and a releasing position, where the first locking portion and the second locking portion are separated. A first elastic member applies an elastic force to the first lever in a direction toward the coupling position, and a switching unit installed at the tray, and locking the first lever at the coupling position by a magnetic force, and unlocks and moves the first lever to the releasing position by temporarily offsetting the magnetic force. Additionally, a returning unit makes the first lever return to the coupling position from the releasing position when the tray is unloaded.

According to one aspect, the switching unit has a second lever to move the first lever in a direction toward the releasing position, a second elastic member that applies an elastic force to the second lever to move the first lever in a direction toward the releasing position, a mobile piece connected to the second lever, that moves according to movement of the second lever, a magnet that exerts an attractive magnetic force on the mobile piece, and a coil portion interposed between the mobile piece and the magnet, that generates a magnetic force in a direction opposite to the direction of the magnetic force of the magnet when current is applied to the coil portion.

According to one aspect, the returning unit has a cam portion located on the first lever to contact the first locking portion and move the first lever to the coupling position when the tray moves out of the fixed frame.

According to one aspect, the second locking portion has a hook step, by which the first locking portion is engaged, and an interference portion inclined to engage the first locking portion when the tray is loaded, so that the first lever moves in a direction opposite to a direction of the elastic force of the first elastic member.

According to one aspect, the tray locking apparatus additionally has a releasing unit to manually access the first lever and move the first lever to the releasing position. The releasing unit has a releasing portion provided at the first lever wherein an object is inserted through a through hole formed in a front surface of the tray.

According to one aspect, the first lever is coupled to a pivot shaft of the tray and pivots. The second lever is coupled to the pivot shaft together with the first lever.

According to one aspect, the first lever, the first elastic member, the switching unit, and the returning unit are assembled onto an additional bracket, and the assembled additional bracket is installed on the tray lever.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE INVENTION

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
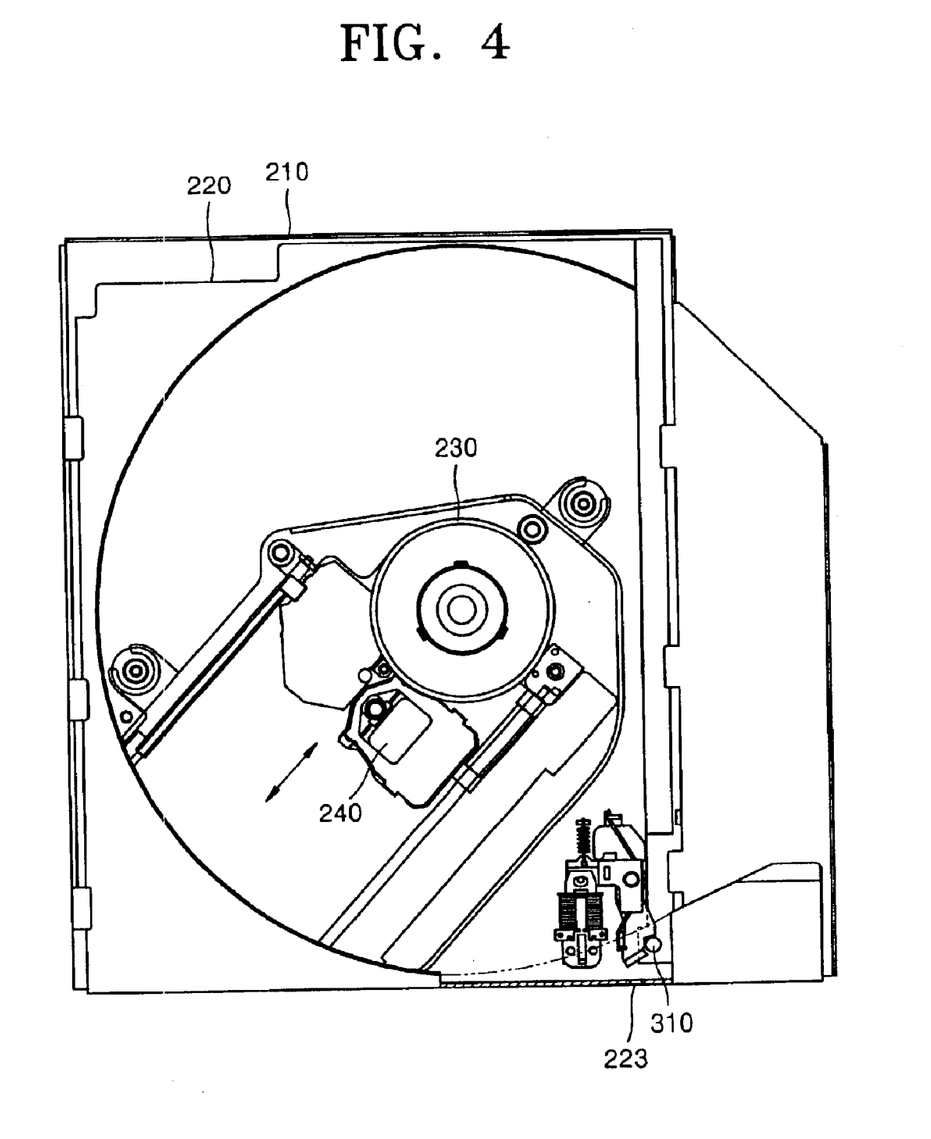
FIG. 4 is a plan view illustrating an optical disk drive adopting a tray locking apparatus according to an embodiment of the present invention.
Figure 5:
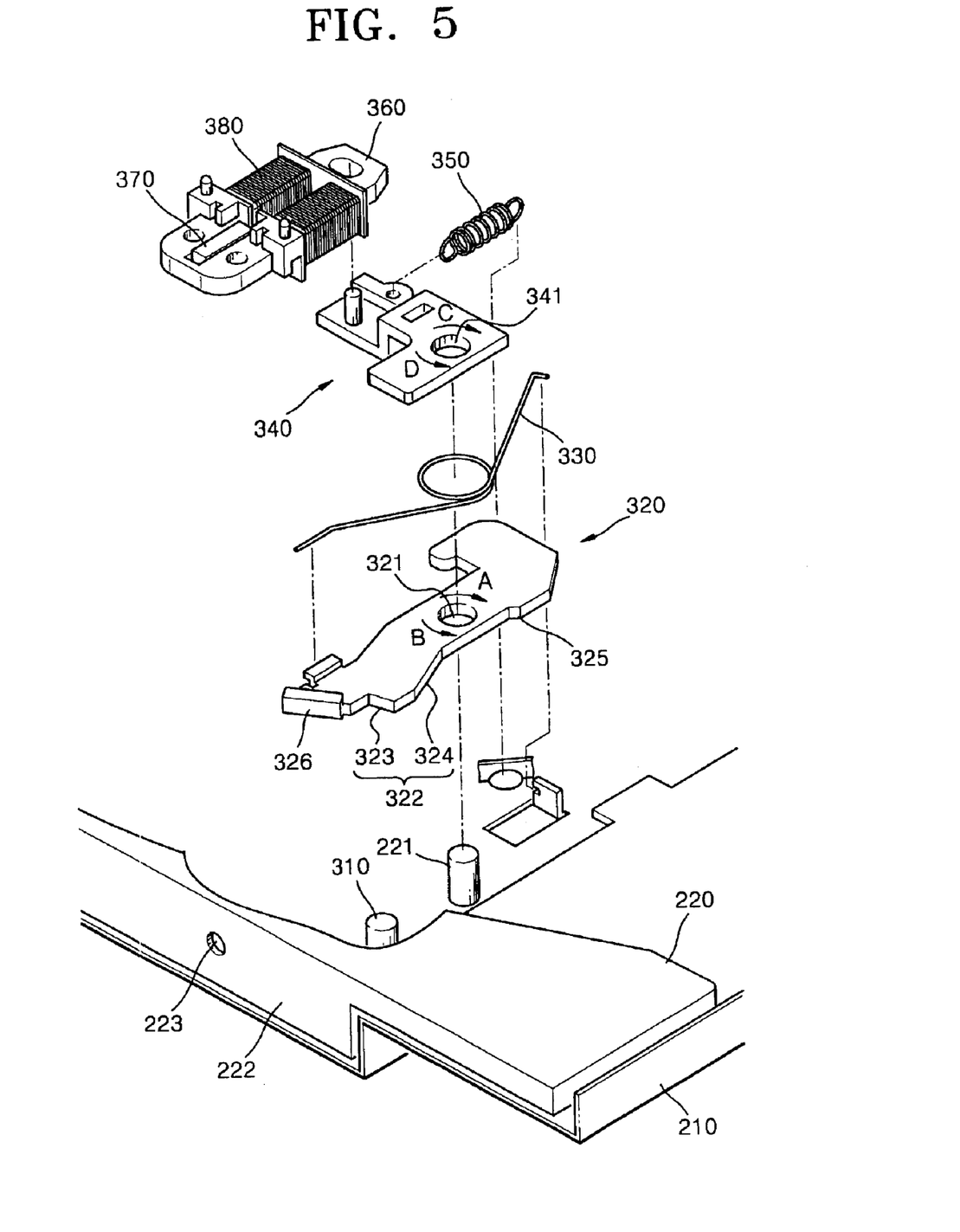
FIG. 5 is an exploded perspective view illustrating the tray locking apparatus of FIG. 4.

FIG. 4 shows an optical disk drive adopting a tray locking apparatus according to a preferred embodiment of the present invention. FIG. 5 shows in detail the tray locking apparatus of FIG. 4.

Referring to FIGS. 4 and 5, a tray 220 slides with respect to a fixed frame 210 to load and unload a disk. A spindle motor 230 that rotates a disk, and an optical pickup portion 240 to record and reproduce information on and from the disk are installed on the tray 220. According to one aspect, the spindle motor 230 and the optical pickup portion 240 are installed on the fixed frame 210.

A first locking portion 310 is provided at the right side of the fixed frame 210. The first locking portion 310 is coupled to a second locking portion 322 (which will be described later) when disk loading is completed, so that the tray 220 is locked in the fixed frame 210. According to one aspect, the first locking portion 310 is integrally formed with the fixed frame 210. According to another aspect, the first locking portion 310 is manufactured as a separate part, as shown in FIG. 4, to be pressed in or attached to the fixed frame 210.

Figure 6:
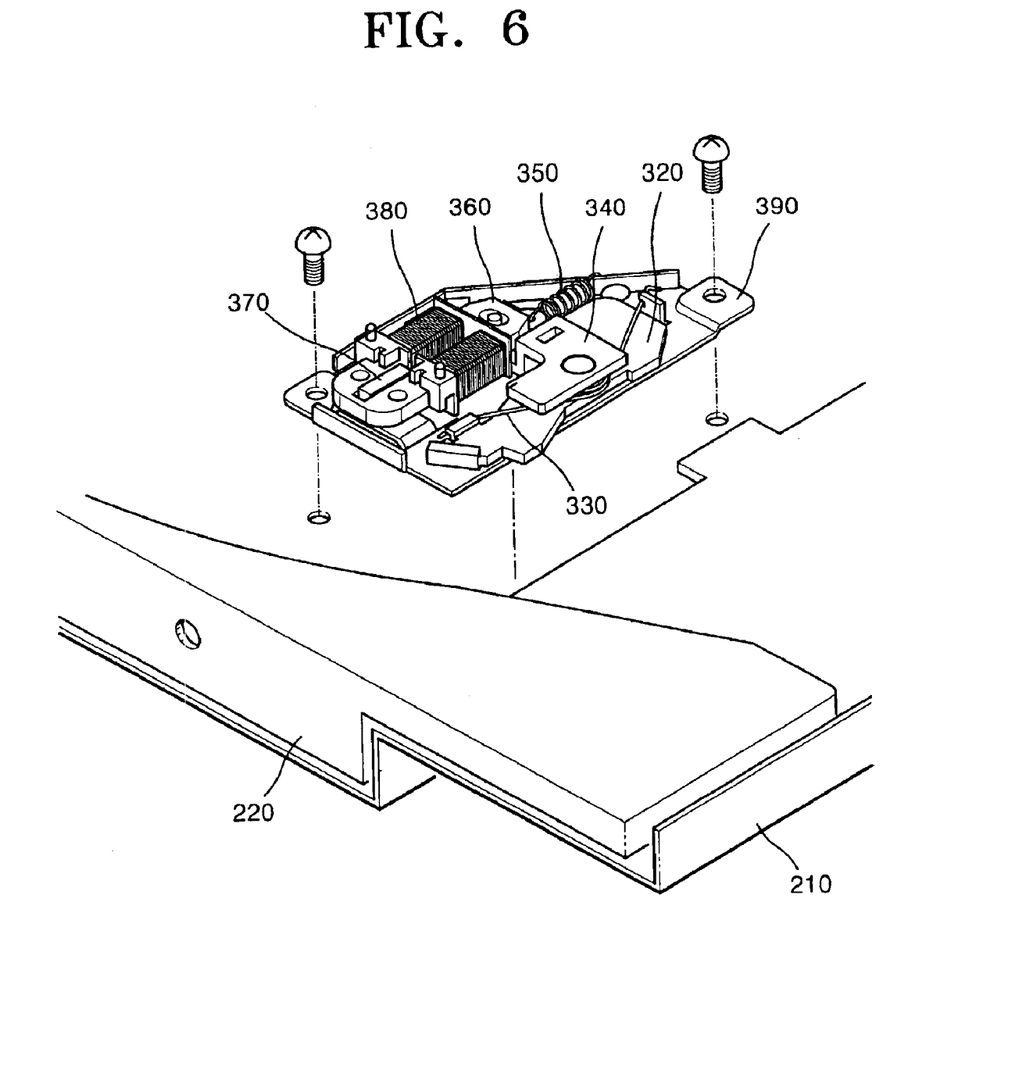
FIG. 6 is a perspective view illustrating an optical disk drive adopting a tray locking apparatus according to another embodiment of the present invention.

A first lever 320, a first elastic member 330, and a switching unit are installed at the right side of the tray 220. According to one aspect, these elements are installed directly on the tray 220, as shown in FIG. 4. According to another aspect, these elements are installed on the tray 220 in the form of a sub-assembly, and are assembled to an additional bracket 390, as shown in FIG. 6. Employing the structure shown in FIG. 6 may increase an efficiency in an assembly process of an optical disk drive.

The switching unit locks and unlocks the first lever 320, and includes a second lever 340, a second elastic member 350, a mobile piece 360, a magnet 370, and a coil portion 380.

The first lever 320 has a hinge portion 321 that is coupled to a pivot shaft 221 of the tray 220. The second locking portion 322, that engages the first locking portion 310 when the tray 220 is locked, and a cam portion 325, that engages the first locking portion 310 when the tray 220 is unloaded, are provided on the first lever 320.

According to one aspect, the second locking portion 322 includes a hook step 323, by which the first locking portion 310 is engaged when the tray 220 is locked, and an interference portion 324 that engages the first locking portion 310 when the tray 220 is loaded, to pivot the first lever 320 in a direction A of FIG. 5. The first lever 320 alternates between a coupling position where the first locking portion 310 and the hook step 323 are engaged, and a releasing position, where the first locking portion 310 and the hook step 323 are separated.

The cam portion 325 is a returning unit, to return the first lever 320 from the releasing position to the coupling position. The cam portion 325 is inclined with respect to a direction in which the tray 220 slides, such that when the tray 220 is unloaded in a state in which the first lever 320 is at the releasing position, the first locking portion 310 engages the cam portion 325, and the first lever 320 pivots in a direction B in FIG. 5. Although the cam portion 325 integrally formed with the first lever 320 is used as the returning unit according to one aspect, according to another aspect, an additional part having the same function as the cam portion 325 is installed on the tray 220.

According to one aspect, a releasing portion 326 is provided on the first lever 320. The purpose of the releasing portion 326 is to manually release the first lever 320 without the switching unit. The releasing portion 326 does not protrude from the front surface 222 of the tray 220. Thus, a through hole 223 is provided in the front surface 222 of the tray 220 to access the releasing portion 326.

The first elastic member 330 applies an elastic force to the first lever 320 so that the first lever 320 is biased toward the coupling position, in which the first locking portion 310 engages to the hook step 323, that is, the direction B on the drawing. According to one aspect, the first elastic member 330 is a torsion spring that is coupled to the hinge portion 321 of the first lever 320. According to another aspect, the first elastic member 330 is a tension coil spring. According to yet another aspect, the first elastic member 330 is a leaf spring.

The second lever 340 is pivotably installed on the tray 220. According to one aspect the hinge portion 341 of the second lever 340 is coupled to the pivot shaft 221 where the hinge portion 321 of the first lever 320 is coupled. According to another aspect, the hinge portion 341 is coupled to an additional pivot shaft (not shown). The mobile piece 360 and the second elastic member 350 are coupled to the second lever 340. Also in the coupling position, the second lever 340 contacts the first lever 320 and prevents the first lever 320 from pivoting under the influence of the elastic force of the first elastic member 330.

The second elastic member 350 applies an elastic force to the second lever 340 so that the first lever 320 pivots to the releasing position where the first locking portion 310 and the hook step 323 are separated. According to one aspect, the second elastic member 350 is a tension coil spring. According to another aspect, the second elastic member 350 is a torsion spring. According to yet another aspect, the second elastic member 350 is a leaf spring. The elastic force that the second elastic member 350 applies to the second lever 340 must be sufficient to pivot the first lever 320 in the direction A, and overcome the elastic force of the first elastic member 330.

The mobile piece 360 is made of a magnetically attractive material. According to one aspect, the magnet 370 is a permanent magnet. The mobile piece 360 is connected to the second lever 340 and reciprocates toward and away from the magnet 370 according to the rotation of the second lever 340. The mobile piece 360 reciprocates toward the magnet 370 when the first lever 320 is in the coupling position. The magnetic force of the magnet 370 must be greater than the elastic force of the second elastic member 350. Generally, the magnetic force of magnets can be adjusted to be great or weak according to the degree of magnetization, thus to increase the magnetic force of the magnet 370, it is often unnecessary to increase the size. But if the size of the magnet 370 must be increased, since the magnet 370 can be made in a variety of shapes, the space into which the magnet 370 is installed may be efficiently utilized.

The coil portion 380 is interposed between the mobile piece 360 and the magnet 370. When current is applied to the coil portion 380, the coil portion 380 generates a magnetic force in a direction opposite to the magnetic force of the magnet 370, so that the mobile piece 360 is separated from the magnet 370. The coil portion 380 only needs to offset the magnetic force of the magnet 370 such that the net magnetic force on the mobile piece 360 is less than the elastic force of the second elastic member 350. Thus, the size of the coil portion 380 is smaller than the conventional solenoid (160 of FIG. 2).

When the tray 220 is loaded and locked to the fixed frame 210 and the mobile piece 360 is separated from the magnet 370, the second lever 340 pivots in a direction C by the elastic force of the second elastic member 350, and the first lever 320 pivots in the direction A to be disposed at the releasing position. When the tray 220 is unloaded, the first locking portion 310 interferes with the cam portion 325 so that the first lever 320 pivots in the direction B to be disposed at the coupling position and the second lever 340 pivots in a direction D so that the mobile piece 360 moves toward the magnet 370.

Referring to FIGS. 7 through 10, the loading and unloading operations of the tray having the structure shown in FIGS. 4 through 6 are described below. FIGS. 7 through 10 are plan views illustrating a state in which the tray is locked by the tray locking apparatus, the unlocking operation, the returning operation, and the locking operation, respectively.

Figure 7:
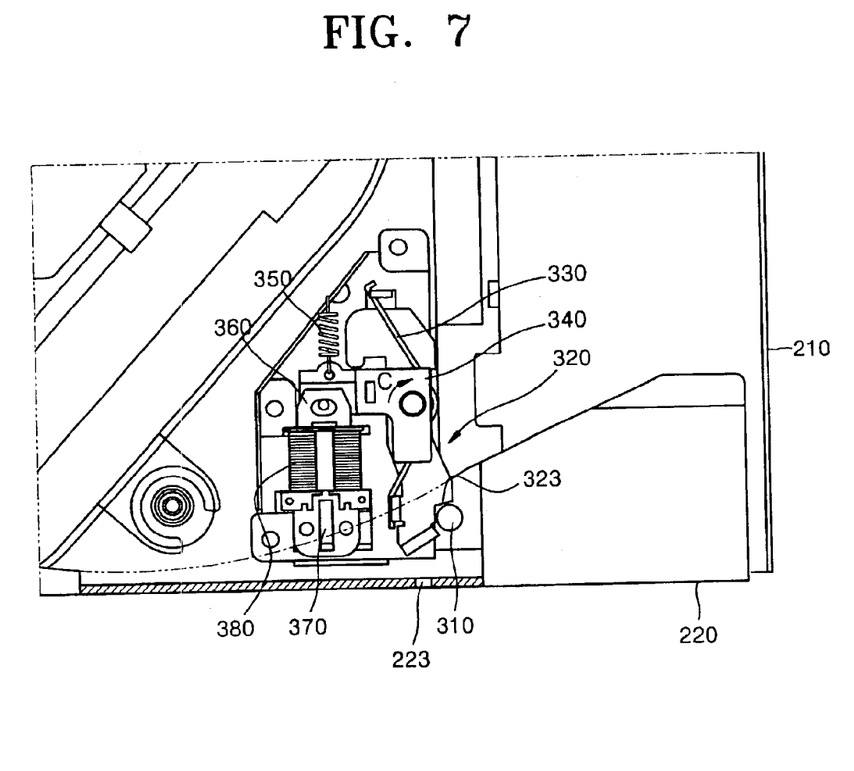
FIG. 7 is a plan view illustrating a state in which the tray locking apparatus of FIG. 4 is locked.

As shown in FIG. 7, the magnetic force from the magnet 370 acting on the mobile piece 360 is stronger than the elastic force of the second elastic member 350 acting on the second lever 340, and the second lever 340 is prevented from pivoting in the direction C. Thus, the first lever 320 contacts the second lever 340 and is maintained at the coupling position, where the hook step 323 and the first locking portion 310 are coupled by the elastic force of the first elastic member 330.

Figure 8:
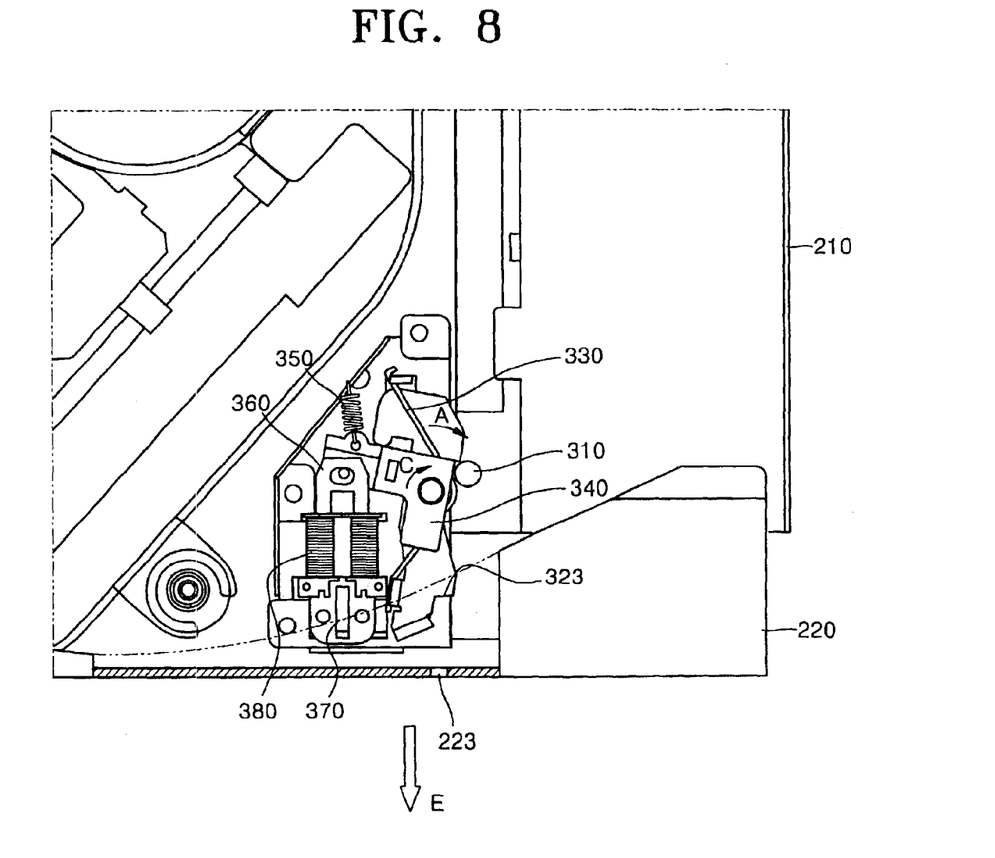
FIG. 8 is a plan view illustrating an unlocking operation of the tray locking apparatus of FIG. 4.

When current is applied to the coil portion 380, a magnetic force in a direction opposite to the direction of the magnetic force of the magnet 370 is generated to offset the magnetic force of the magnet 370. Then, as shown in FIG. 8, the mobile piece 360 separates from the magnet 370 and the second lever 340 pivots in the direction C due to the elastic force of the second elastic member 350. The second lever 340 pushes the first lever 320 causing the first lever 320 pivot in the direction A, so that the first locking portion 310 is released from the hook step 323. The current applied to the coil portion 380 is discontinued immediately when the mobile piece 360 separates from the magnet 370. When the first locking portion 310 is released from the hook step 323, a pushing unit (not shown) slightly pushes the tray 220 in a direction E, in which the tray 220 is unloaded. The tray 220 is then pulled further in the direction E to be unloaded.

Figure 9:
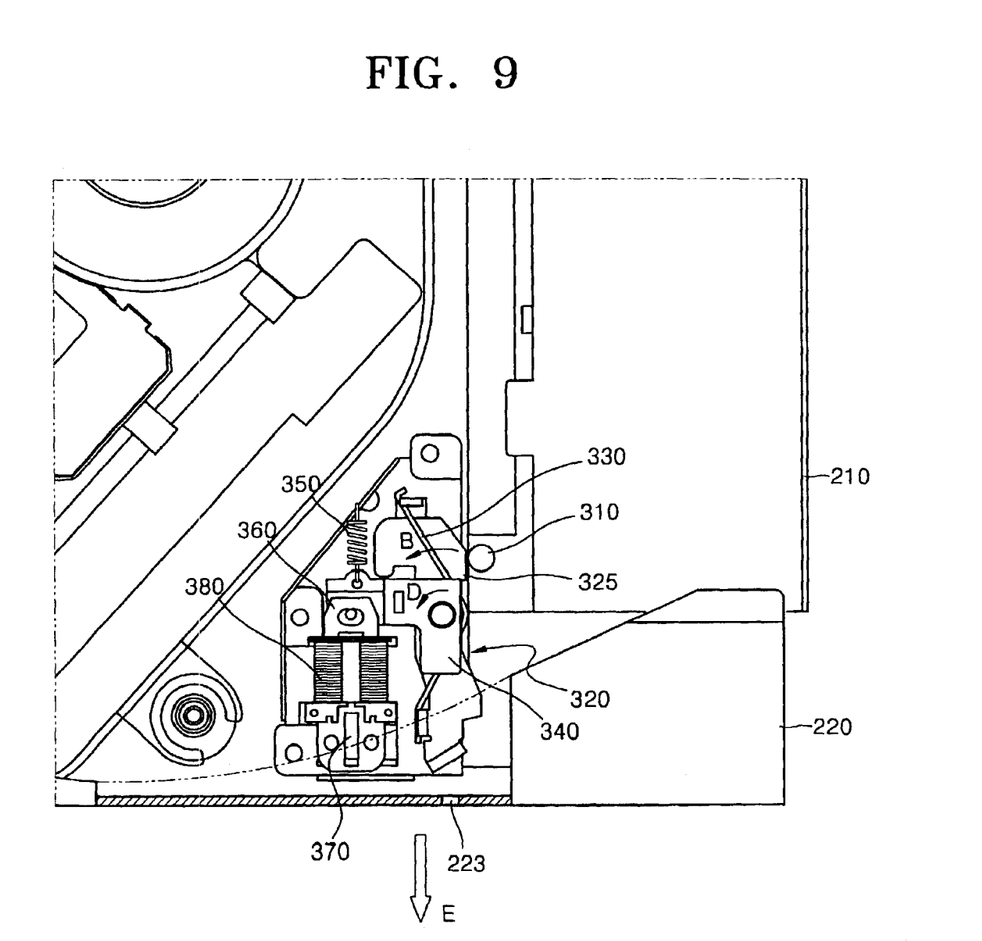
FIG. 9 is a plan view illustrating a returning operation of the tray locking apparatus of FIG. 4.

As shown in FIG. 9, during which the tray 220 is unloaded, the first locking portion 310 contacts the cam portion 325 of the first lever 320, and pivots the first lever in the direction B. Then the second lever 340, contacting the first lever 320, pivots in the direction D, and the mobile piece 360 connected to the second lever 340 slides toward the magnet 370 due to the magnetic force of the magnet 370. The first lever 320 is maintained at the coupling position by the elastic force of the first elastic member 330 when the tray 220 is unloaded.

Figure 10:
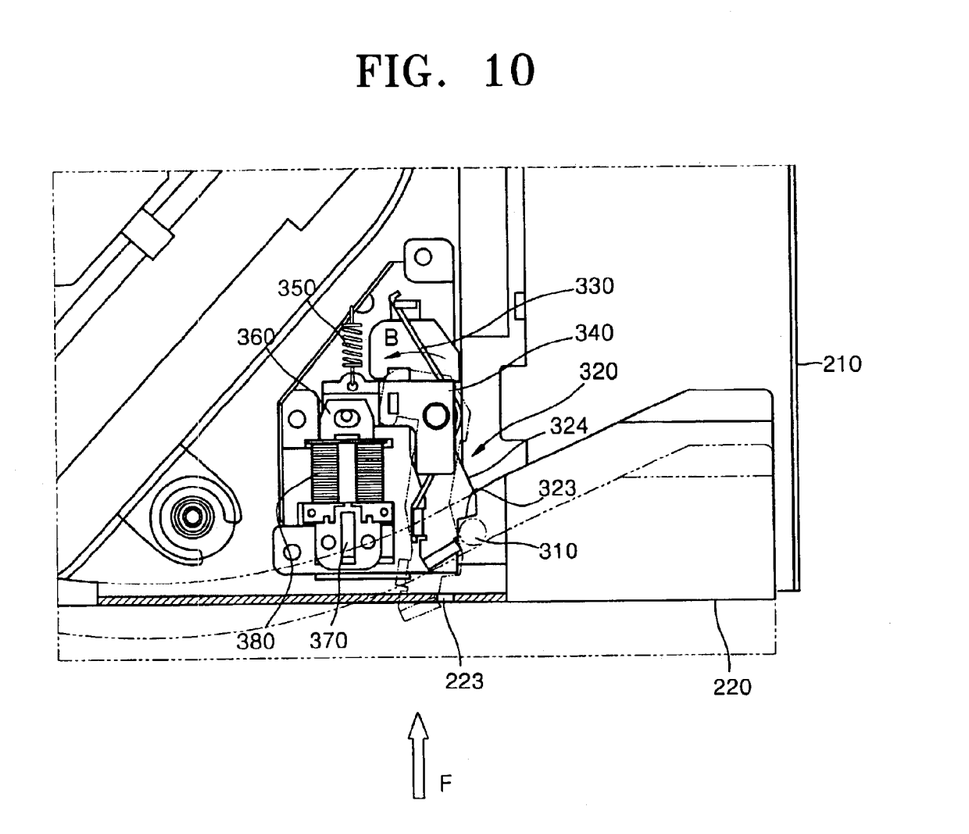
FIG. 10 is a plan view illustrating a locking operation of the tray locking apparatus of FIG. 4.

When the tray 220 is pushed in a direction F to be loaded, as shown in FIG. 10, the first locking portion 310 interferes with the interference portion 324 of the first lever 320 and the first lever 320 pivots in the direction A. Since the second lever 340 does not pivot in this operation, the mobile piece 360 maintains its position, relative to the magnet 370. When the first locking portion 310 separates from the interference portion 324, the first lever 320 pivots in the direction B due to the elastic force of the first elastic member 330. Then, the first locking portion 310 is coupled to the hook step 323, so that the tray 220 is fixed, and thus the loading operation is completed.

If the tray 220 needs to be unloaded in a state in which electrical power is not supplied to the optical disk drive, or the coil portion 380 does not operate, the releasing portion 326 formed on the first lever 320 is pushed by inserting a paper clip or other similar device through the through hole 223 from the front surface 222 of the tray 220, causing the first lever 320 to pivot in the direction A (see FIG. 8). Then, the tray 220 is pulled in the direction E to be unloaded.

As described above, the coil portion 380 only operates to separate the mobile piece 360 from the magnet 370. The locking state is maintained by the magnetic force of the magnet 370 and the elastic force of the first elastic member 330. Thus, to increase a locking force of the first lever 320, only the elastic force of the first and second elastic members 330 and 350 and the magnetic force of the magnet 370 need to be increased. Further, there is no need to increase the size of the coil portion 380 or the amount of current applied to the coil portion 380 because the coil portion 380 only needs to offset the magnetic force of the magnet 370 so that the net magnetic force applied to the mobile piece of the magnet 370 is less than the elastic force of the second elastic member 350. Thus, the cost and volume increase associated with an increase in the capacity of the coil portion 380 can be avoided. Also, since the magnet 370 can be manufactured to have a shape corresponding to the shape of a space in the optical disk drive, a slim optical disk drive can be realized.

Furthermore, as can be seen from FIGS. 4 through 9, since the respective constituent elements mainly have slim flat shapes, and motion of the moving parts is primarily planar, a tray locking apparatus capable of performing a stable locking with a small operational space can be realized.

In the above preferred embodiment, a case in which the tray 220 is locked or unlocked with respect to the fixed frame 210 as the first lever 320 and the second lever 340 pivot correlatively is described. However, the operation of the first and second levers 320 and 340 is not limited to the pivoting. According to one aspect, apparatus of FIG. 4 can be realized by a sliding structure.

As described above, the tray locking apparatus of the optical disk drive according to the present invention has the following effects. First, since the respective constituent elements mainly have slim flat shapes, and the motion of the parts is primarily planar, a tray locking apparatus capable of performing a stable locking with a small operational space can be realized.

Second, since the magnet can be made into a variety of shapes to fit to the shape of a space in the optical disk drive, a slim optical disk drive can be realized.

Third, since the tray locking apparatus is configured to enable stable locking and unlocking operations with the minimum number of constituent elements, manufacturing costs can be reduced. Further, when the tray locking apparatus is configured as a sub-assembly, assembly efficiency can be improved and further reduce manufacturing costs.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A tray locking apparatus of an optical disk drive including a fixed frame and a tray installed in the fixed frame, that loads and unloads a disk, the tray locking apparatus comprising:

a first locking portion provided on the fixed frame;

a first lever having a second locking portion selectively coupled to the first locking portion and installed on the tray to move between a coupling position where the first locking portion and the second locking portion are coupled, and a releasing position where the first locking portion and the second locking portion are separated;

a first elastic member applying an elastic force to the first lever in a direction toward the coupling position;

a switching unit installed on the tray that locks the first lever at the coupling position by a magnetic force, and unlocks and moves the first lever to the releasing position by temporarily offsetting the magnetic force; and a returning unit to return the first lever to the coupling position from the releasing position when the tray is unloaded.

2. The tray locking apparatus as claimed in claim 1, wherein the switching unit comprises:

a second lever to move the first lever in a direction toward the releasing position;

a second elastic member that applies an elastic force to the second lever to move the first lever in a direction toward the releasing position;

a mobile piece connected to the second lever, that moves according to movement of the second lever;

a magnet that exerts an attractive magnetic force on the mobile piece; and a coil portion interposed between the mobile piece and the magnet, that generates a magnetic force in a direction opposite to the direction of the magnetic force of the magnet when current is applied to the coil portion.

3. The tray locking apparatus as claimed in claim 2, further comprising:

a pivot shaft attached to the tray, wherein the first lever is coupled to the pivot shaft and pivots about the pivot shaft.

4. The tray locking apparatus as claimed in claim 3, wherein:

the second lever is coupled to the pivot shaft.

5. The tray locking apparatus as claimed in claim 4, wherein:

the returning unit comprises a cam portion located on the first lever so that when the tray slides into the fixed frame, the cam portion engages the first locking portion, and the first lever pivots to the coupling position; and the second locking portion comprises
a hook step, by which the first locking portion is engaged, and
an interference portion inclined to engage the first locking portion when the tray is loaded, so that the first lever pivots in a direction opposite to a direction of the elastic force of the first elastic member.

6. The tray locking apparatus as claimed in claim 5, further comprising:

a releasing portion provided on the first lever, wherein a front surface of the tray has a through hole, and an object is inserted through the through hole to contact the releasing portion and pivot the first lever to the releasing position.

7. The tray locking apparatus as claimed in claim 6, further comprising:

an additional bracket, wherein the first lever, the first elastic member, the switching unit, and the returning unit are assembled onto the additional bracket, and the assembled additional bracket is installed on the tray.

8. The tray locking apparatus as claimed in claim 1, wherein the returning unit comprises:

a cam portion, located on the first lever, to contact the first locking portion and move the first lever to the coupling position when the tray moves out of the fixed frame.

9. The tray locking apparatus as claimed in claim 1, wherein the second locking portion comprises:

a hook step by which the first locking portion is engaged; and an interference portion inclined to engage the first locking portion when the tray is loaded, so that the first lever moves in a direction opposite to a direction of the elastic force of the first elastic member.

10. The tray locking apparatus as claimed in claim 1, further comprising:

a releasing unit to manually access the first lever, and move the first lever to the releasing position.

11. The tray locking apparatus as claimed in claim 10, wherein:

a front surface of the tray has a through hole; and the releasing unit comprises a releasing portion provided on the first lever, wherein an external object is insertable through the through hole to contact the releasing portion and move the first lever to the releasing position.

12. The tray locking apparatus as claimed in claim 1, further comprising:

an additional bracket, wherein the first lever, the first elastic member, the switching unit, and the returning unit are assembled onto the additional bracket, and the assembled additional bracket is installed on the tray.

13. An optical disk drive comprising:

a fixed frame;

a tray installed in the fixed frame, that loads and unloads a disk; and a tray locking apparatus to lock or unlock the tray with respect to the fixed frame, wherein the tray locking apparatus has:

a first locking portion provided on the fixed frame;

a first lever having a second locking portion selectively coupled to the first locking portion and installed on the tray to move between a coupling position where the first locking portion and the second locking portion are coupled, and a releasing position where the first locking portion and the second locking portion are separated;

a first elastic member applying an elastic force to the first lever in a direction toward the coupling position;

a switching unit installed on the tray that locks the first lever at the coupling position by a magnetic force, and unlocks and moves the first lever to the releasing position by temporarily offsetting the magnetic force; and a returning unit that returns the first lever to the coupling position from the releasing position when the tray is unloaded.

14. The optical disk drive as claimed in claim 13, wherein the switching unit comprises:

a second lever to move the first lever in a direction toward the releasing position;

a second elastic member that applies an elastic force to the second lever to move the first lever in a direction toward the releasing position;

a mobile piece connected to the second lever, that moves according to movement of the second lever;

a magnet that exerts an attractive magnetic force on the mobile piece; and a coil portion interposed between the mobile piece and the magnet, that generates a magnetic force in a direction opposite to the direction of the magnetic force of the magnet when current is applied to the coil portion.

15. The optical disk drive as claimed in claim 14, further comprising:

a pivot shaft attached to the tray, wherein the first lever is coupled to the pivot shaft and pivots about the pivot shaft.

16. The optical disk drive as claimed in claim 15, wherein:

the second lever is coupled to the pivot shaft.

17. The optical disk drive as claimed in claim 16, wherein:

the returning unit comprises a cam portion located on the first lever so that when the tray slides into the fixed frame, the cam portion engages the first locking portion, and the first lever pivots to the coupling position; and the second locking portion comprises a hook step, by which the first locking portion is engaged, and an interference portion inclined to engage the first locking portion when the tray is loaded, so that the first lever pivots in a direction opposite to a direction of the elastic force of the first elastic member.

18. The optical disk drive as claimed in claim 17, further comprising:

a releasing portion provided on the first lever, wherein a front surface of the tray has a through hole, and an external object is insertable through the through hole to contact the releasing portion and pivot the first lever to the releasing position.

19. The optical disk drive as claimed in claim 18, further comprising:

an additional bracket, wherein the first lever, the first elastic member, the switching unit, and the returning unit are assembled onto the additional bracket, and the assembled additional bracket is installed on the tray.

20. The optical disk drive as claimed in claim 13, wherein the returning unit comprises:

a cam portion, located on the first lever, to contact the first locking portion and move the first lever to the coupling position when the tray moves out of the fixed frame.

21. The optical disk drive as claimed in claim 13, wherein the second locking portion comprises:

a hook step by which the first locking portion is engaged; and an interference portion inclined to engage the first locking portion when the tray is loaded, so that the first lever moves in a direction opposite to a direction of the elastic force of the first elastic member.

22. The optical disk drive as claimed in claim 13, further comprising:
a releasing unit to manually access the first lever, and move the first lever to the releasing position.
23. The optical disk drive as claimed in claim 22, wherein:
a front surface of the tray has a through hole; and
the releasing unit comprises a releasing portion provided on the first lever,
wherein an external object is insertable through the through hole to contact the releasing portion and move the first lever to the releasing position.
24. The optical disk drive as claimed in claim 13, further comprising:
an additional bracket,
wherein the first lever, the first elastic member, the switching unit, and the returning unit are assembled onto the additional bracket, and the assembled additional bracket is installed on the tray.
25. A tray locking apparatus of an optical disk drive comprising:
a first member that moves between a coupling position and a releasing position;
a returning unit to return the first member to the coupling position from the releasing position when a tray of the optical disk drive is unloaded; and
a switching unit, coupled to the first member, and having a magnet and a coil portion,
wherein the switching unit
locks the first member in the coupling position with a first magnetic force, and
selectively reduces a net magnetic force of the switching unit to unlock and move the first member to the releasing position.
26. The tray locking apparatus claimed in claim 25, wherein:
the first magnetic force is generated by the magnet; and
the switching unit selectively reduces a net magnetic force of the switching unit by generating a second magnetic force, opposite to the direction of the first magnetic force, when a current is applied to the coil portion.
27. The tray locking apparatus claimed in claim 26, wherein the optical disk drive includes a fixed frame and a tray that moves in and out of the fixed frame to load and unload a disk, the tray locking apparatus further comprising:
a first locking portion provided on the fixed frame; and
a first elastic member that applies a first elastic force to the first member, to bias the first member towards the coupling position.
28. The tray locking apparatus claimed in claim 27, wherein the first member comprises:
a second locking portion,
wherein when the first member is in the coupling position, the first and second locking portions are coupled, and when the first member is in the releasing position, the first and second locking portions are separated.
29. The tray locking apparatus claimed in claim 28, wherein the switching unit comprises:
a second member that moves the first member towards the releasing position;
a second elastic member that applies a second elastic force to the second member to move the first member towards the releasing position; and
a mobile piece, connected to the second member, that moves under the influence of the first and second magnetic forces and the second elastic force,
wherein
the first magnetic force is greater than the second elastic force,
the second elastic force is greater than the net magnetic force of the switching unit when the current is applied to the coil portion,
when the first member is in the coupling position, the first magnetic force maintains the mobile piece and the second member in a first position, and
when the current is applied to the coil portion, the second elastic force moves the second member and the mobile piece to a second position, and the movement of the second member moves the first member from the coupling position to the releasing position.
30. The tray locking apparatus claimed in claim 29, wherein:
the second elastic member is one of a torsion spring, a tension coil spring, and a leaf spring.
31. The tray locking apparatus claimed in claim 29, wherein:
the first and second members translate.
32. The tray locking apparatus claimed in claim 27, wherein:
the first elastic member is one of a torsion spring, a tension coil spring, and a leaf spring.
33. The tray locking apparatus claimed in claim 25, wherein:
the magnet is a permanent magnet.
34. A tray locking apparatus of an optical disk drive including a fixed frame and a tray that moves in and out of the fixed frame to load and unload a disk, the tray locking apparatus comprising:
a first member that moves between a coupling position and a releasing position;
a first elastic member that applies a first elastic force to the first member, to bias the first member towards the coupling position
a returning unit to return the first member to the coupling position from the releasing position;
a first locking portion provided on the fixed frame; and
a switching unit, coupled to the first member, and having a magnet and a coil portion,
wherein the switching unit locks the first member in the coupling position with a first magnetic force, and selectively reduces a net magnetic force of the switching unit to unlock and move the first member to the releasing position, and
the returning unit is a cam portion, located on the first member, that is shaped such that when the cam portion contacts the first locking portion, the first member moves to the coupling position.
35. A tray locking apparatus of an optical disk drive including a fixed frame and a tray that moves in and out of the fixed frame to load and unload a disk, the tray locking apparatus comprising:
a first member that moves between a coupling position and a releasing position;
a first elastic member that applies a first elastic force to the first member, to bias the first member towards the coupling position;
a first locking portion provided on the fixed frame;
a second locking portion having
a hook step that engages the first locking portion when the first member is in the coupling position, and an interference portion, inclined to engage the first locking portion when the tray moves into the fixed frame, and move the first member in a direction opposite to a direction of the first elastic force; and a switching unit, coupled to the first member, and having a magnet and a coil portion, wherein the switching unit looks the first member in the coupling position with a first magnetic force, and selectively reduces a net magnetic force of the switching unit to unlock and move the first member to the releasing position, and when the first member is in the coupling position, the first and second locking portions are coupled, and when the first member is in the releasing position, the first and second locking portions are separated.

36. A tray locking apparatus of an optical disk drive including a fixed frame and a tray that moves in and out of the fixed frame to load and unload a disk, the tray locking apparatus comprising:

a first locking portion provided on the fixed frame;

a first member that moves between a coupling position and a releasing position, the first member comprising a second locking portion, such that when the first member is in the coupling position, the first and second locking portions are coupled, and when the first member is in the releasing position, the first and second locking portions are separated;

a first elastic member that applies a first elastic force to the first member, to bias the first member towards the coupling position; and a switching unit coupled to the first member, that locks the first member in the coupling position with a first magnetic force, and selectively reduces a net magnetic force of the switching unit to unlock and move the first member to the releasing position, the switching unit comprising:

a magnet generating the first magnetic force, a coil portion generating a second magnetic force, opposite to the direction of the first magnetic force, when a current is applied to the coil portion, a second member that moves the first member towards the releasing position, a second elastic member that applies a second elastic force to the second member to move the first member towards the releasing position, and a mobile piece, connected to the second member, that moves under the influence of the first and second magnetic forces and the second elastic force, wherein the first magnetic force is greater than the second elastic force, the second elastic force is greater than the net magnetic force of the switching unit when the current is applied to the coil portion, when the first member is in the coupling position, the first magnetic force maintains the mobile piece and the second member in a first position, when the current is applied to the coil portion, the second elastic force moves the second member and the mobile piece to a second position, and the movement of the second member moves the first member from the coupling position to the releasing position, and the first and second members rotate.

37. The tray locking apparatus claimed in claim 36, further comprising:

a pivot shaft attached to the tray, wherein the first member is coupled to the pivot shaft and pivots about the pivot shaft.

38. The tray locking apparatus claimed in claim 37, wherein:

the second member is coupled to the pivot shaft and pivots about the pivot shaft.

39. The tray locking apparatus claimed in claim 37, further comprising:

an additional pivot shaft attached to the tray, wherein the second member is coupled to the additional pivot shaft and pivots about the additional pivot shaft.

40. A tray locking apparatus of an optical disk drive including a fixed frame and a tray that moves in and out of the fixed frame to load and unload a disk, the tray locking apparatus comprising:

a first locking portion provided on the fixed frame;

a first member that moves between a coupling position and a releasing position, the first member comprising a second locking portion, such that when the first member is in the coupling position, the first and second locking portions are coupled, and when the first member is in the releasing position, the first and second locking portions are separated;

a first elastic member that applies a first elastic force to the first member, to bias the first member towards the coupling position;

an additional bracket;

a returning unit to return the first member to the coupling position from the releasing position; and a switching unit coupled to the first member, that locks the first member in the coupling position with a first magnetic force, and selectively reduces a net magnetic force of the switching unit to unlock and move the first member to the releasing position, the switching unit comprising a magnet generating the first magnetic force, a coil portion generating a second magnetic force, opposite to the direction of the first magnetic force, when a current is applied to the coil portion, a second member that moves the first member towards the releasing position, a second elastic member that applies a second elastic force to the second member to move the first member towards the releasing position, and a mobile piece, connected to the second member, that moves under the influence of the first and second magnetic forces and the second elastic force, wherein the first magnetic force is greater than the second elastic force, the second elastic force is greater than the net magnetic force of the switching unit when the current is applied to the coil portion, when the first member is in the coupling position, the first magnetic force maintains the mobile piece and the second member in a first position, when the current is applied to the coil portion, the second elastic force moves the second member and the mobile piece to a second position, and the movement of the second member moves the first member from the coupling position to the releasing position, and the first member, the first elastic member, the switching unit, and the returning unit are assembled onto the additional bracket, and the assembled additional bracket is installed on the tray.

* * * * *

UNITED STATES PATENT AND TRADEMARK OFFICE
CERTIFICATE OF CORRECTION

PATENT NO. : 6,954,936 B2 Page 1 of 1
APPLICATION NO. : 10/434360
DATED : October 11, 2005
INVENTOR(S) : Cheol-woong Ahn It is certified that error appears in the above-identified patent and that said Letters Patent is hereby corrected as shown below:

<u>Column 13,</u>
Line 7, replace "looks" with -- locks --.

Signed and Sealed this

Twentieth Day of June, 2006

JON W. DUDAS
*Director of the United States Patent and Trademark Office*